US010943199B1

(12) United States Patent
Nidy

(10) Patent No.: US 10,943,199 B1
(45) Date of Patent: Mar. 9, 2021

(54) INVENTORY RECOMMENDATION TOOL AND METHOD

(71) Applicant: Dawn Nidy, San Diego, CA (US)

(72) Inventor: Dawn Nidy, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 796 days.

(21) Appl. No.: 14/629,301

(22) Filed: Feb. 23, 2015

(51) Int. Cl.
*G06Q 10/06* (2012.01)
*G06Q 30/06* (2012.01)
*G06Q 10/08* (2012.01)

(52) U.S. Cl.
CPC ..... *G06Q 10/06315* (2013.01); *G06Q 10/087* (2013.01); *G06Q 30/0631* (2013.01); *G06Q 30/0643* (2013.01)

(58) Field of Classification Search
None
See application file for complete search history.

(56) References Cited

U.S. PATENT DOCUMENTS

| | | | | |
|---|---|---|---|---|
| 7,092,929 | B1 * | 8/2006 | Dvorak | G06Q 10/087 705/28 |
| 7,814,029 | B1 * | 10/2010 | Siegel | G06Q 30/0282 705/1.1 |
| 8,346,630 | B1 * | 1/2013 | McKeown | G06Q 10/087 705/22 |
| 8,447,664 | B1 * | 5/2013 | Pape | G06Q 10/087 705/28 |
| 9,189,811 | B1 * | 11/2015 | Bhosle | G06Q 30/0631 |
| 2003/0061125 | A1 * | 3/2003 | Hoffman | G06Q 10/06 705/28 |
| 2006/0179045 | A1 * | 8/2006 | Grinsfelder | G06Q 30/02 |
| 2008/0082427 | A1 * | 4/2008 | Gandhi | G06Q 10/087 705/28 |
| 2010/0070333 | A1 * | 3/2010 | Musa | G06Q 10/087 705/28 |
| 2010/0088158 | A1 * | 4/2010 | Pollack | G06Q 30/02 705/7.35 |

(Continued)

*Primary Examiner* — Rutao Wu
*Assistant Examiner* — Sarjit S Bains
(74) *Attorney, Agent, or Firm* — Ferguson Braswell Fraser Kubasta PC

(57) ABSTRACT

A method and system for providing inventory recommendations that includes receiving, from a business management application (BMA) used by a business entity, an inventory recommendation tool use request to use an inventory recommendation tool; receiving inventory item information related to an inventory item from the BMA; performing an inventory categorization operation based on the inventory item information to obtain inventory categorization information; storing the inventory categorization information in an inventory recommendation tool data repository; performing an inventory management operation based on the inventory item information to obtain inventory management information; and storing the inventory management information in the inventory recommendation tool data repository. The method also includes receiving, from the BMA, an inventory recommendation request; generating, in response to the inventory recommendation request, an inventory recommendation; and providing the inventory recommendation to the BMA used by the business entity.

20 Claims, 6 Drawing Sheets

(56) References Cited

U.S. PATENT DOCUMENTS

| | | | |
|---|---|---|---|
| 2010/0114615 A1* | 5/2010 | Ganguly | G06F 17/3053 705/5 |
| 2010/0191618 A1* | 7/2010 | Zhu | G06Q 30/0283 705/26.1 |
| 2011/0119162 A1* | 5/2011 | Cohen | G06Q 10/087 705/28 |
| 2012/0226573 A1* | 9/2012 | Zakas | G06Q 30/0207 705/26.2 |
| 2013/0191409 A1* | 7/2013 | Zeng | G06F 17/3064 707/767 |
| 2014/0279195 A1* | 9/2014 | Kubicki | G06Q 30/0631 705/26.7 |
| 2015/0112826 A1* | 4/2015 | Crutchfield, Jr. | G06Q 30/0601 705/26.1 |
| 2016/0162830 A1* | 6/2016 | Devaiah | G06Q 10/087 705/14.13 |
| 2016/0292624 A1* | 10/2016 | Curtland | G06Q 10/087 |

* cited by examiner

INVENTORY RECOMMENDATION TOOL AND METHOD

BACKGROUND

Business entities that offer items for sale to consumers often maintain and manage an inventory of items (e.g., products). Thus, a business entity must make decisions related to acquiring inventory items from vendors, as well as decisions related to the price at which the acquired inventory items are to be sold. Such decisions are generally based on experience the business entity has selling items in the past. However, business entities do not commonly have knowledge of how other business entities that sell similar items maintain and manage their inventories, or how inventory items of similar businesses are selling.

SUMMARY

In general, in one aspect, the invention relates to a method that includes receiving, from a business management application (BMA) used by a business entity, an inventory recommendation tool use request to use an inventory recommendation tool; receiving inventory item information related to an inventory item from the BMA; performing an inventory categorization operation based on the inventory item information to obtain inventory categorization information; storing the inventory categorization information in an inventory recommendation tool data repository; performing an inventory management operation based on the inventory item information to obtain inventory management information; and storing the inventory management information in the inventory recommendation tool data repository. The method also includes receiving, from the BMA, an inventory recommendation request; generating, in response to the inventory recommendation request, an inventory recommendation; and providing the inventory recommendation to the BMA used by the business entity.

In general, in one aspect, the invention relates to a system that includes a computer processor and memory, an inventory recommendation tool data repository; a business management application (BMA) used by a business entity; and an inventory recommendation tool operatively connected to the inventory recommendation data repository and the business management application (BMA). The inventory recommendation tool is stored in memory and executes on the computer processor. Additionally, the inventory recommendation tool includes functionality to receive, from the BMA, an inventory recommendation tool use request to use the inventory recommendation tool, receive, from the BMA, inventory item information related to an inventory item, perform an inventory categorization operation based on the inventory item information to obtain inventory categorization information, store the inventory categorization information in an inventory recommendation tool data repository, perform an inventory management operation based on the inventory item information to obtain inventory management information, and store the inventory management information in the inventory recommendation tool data repository. The inventory recommendation tool is also includes functionality to receive, from the BMA, an inventory recommendation request, generate, in response to the inventory recommendation request, an inventory recommendation, and provide the inventory recommendation to the BMA used by the business entity.

In general, in one aspect, the invention relates to a non-transitory computer readable medium comprising instructions that, when executed by a computer processor, perform a method that includes receiving, from a business management application (BMA) used by a business entity, an inventory recommendation tool use request to use an inventory recommendation tool; receiving, from the BMA, inventory item information related to an inventory item; performing an inventory categorization operation based on the inventory item information to obtain inventory categorization information; storing the inventory categorization information in an inventory recommendation tool data repository; performing an inventory management operation based on the inventory item information to obtain inventory management information; and storing the inventory management information in the inventory recommendation tool data repository. The method also includes receiving, from the BMA, an inventory recommendation request; generating, in response to the inventory recommendation request, an inventory recommendation; and providing the inventory recommendation to the BMA used by the business entity.

Other aspects of the invention will be apparent from the following description and the appended claims.

BRIEF DESCRIPTION OF DRAWINGS

FIGS. 3A and 3B show an example in accordance with one or more embodiments of the invention.

DETAILED DESCRIPTION

Figure 1:
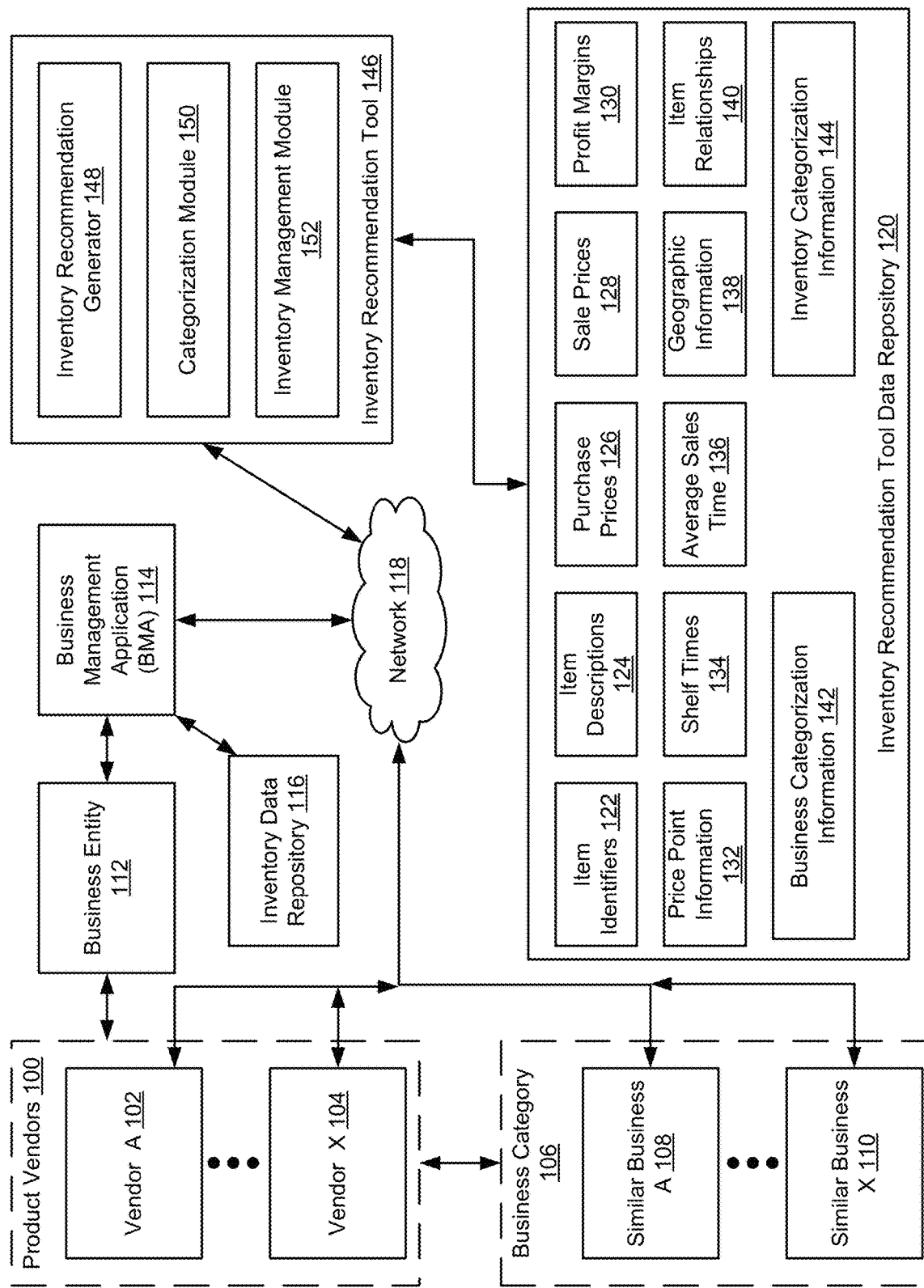
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for providing inventory recommendations and pricing recommendations to a business entity. Specifically, in one or more embodiments of the invention, various types of information relating to the inventories of business entities and/or similar businesses is obtained from the business entities and/or similar businesses, categorized, and analyzed in order to generate a variety of inventory recommendations and/or pricing recommendations for a business entity requesting an inventory recommendation. More specifically, a business entity using a business management application (BMA) may provide one or more categories indicating the type of items sold by the business entity and/or types of items in which the business entity is interested. In one or more embodiments of the invention, the category information provided by the business entity allows an inventory recommendation tool to generate inventory recommendations and/or pricing recommendations that only include inventory items relevant to the categories provided by the business entity.

FIG. 1. shows a system in accordance with one or more embodiments of the invention. As shown in FIG. 1, the system includes product vendors (100), which include vendors (e.g., vendor A (102), vendor X (104)). In one or more embodiments of the invention, the system also includes similar businesses (e.g., similar business A (108), similar business X (110)), which may be included in a business category (106). Additionally, the system may include a business entity (112) using a business management application (BMA) (114) operatively connected to an inventory data repository (116). In one or more embodiments of the invention, the system also includes an inventory recommendation tool (146). The inventory recommendation tool may include an inventory recommendation generator (148), a categorization module (150), and an inventory management module (152). In one or more embodiments of the invention, the inventory recommendation tool is operatively connected to an inventory recommendation tool data repository (120). The inventory recommendation tool data repository may include may variety of information, including, but not limited to, item identifiers (122), item descriptions (124), purchase prices (126), sales prices (128), profit margins (130), price point information (132), shelf times (134), average sales time (136), geographic information (138), item relationships (140), business categorization information (142), and/or inventory categorization information (144). One or more of the aforementioned system components may be connected to one or more other system components via a network (118). Each of these components is described below.

In one or more embodiments of the invention, product vendors (100), such as vendor A (102) and vendor X (104), are any entity organized to sell products to various business entities (e.g., business entity (112)). For example, a vendor (102, 104) may be a shoe wholesaler that sells shoes and shoe related products to one or more shoe stores. In one or more embodiments of the invention, each vendor (102, 104) sells products to one or more business entities. Vendors may sell products to the same business entity to which other vendors also sell products. In one or more embodiments of the invention, not all business entities have a relationship with all vendors. In one or more embodiments of the invention, each vendor has a business relationship with one or more business entities. The relationship may include any communication channel through which a vendor (102, 104) and the one or more business entities may interact. For example, the vendor may provide an online sales portal through which a business entity may place orders for items sold by the vendor. As another example, the vendor may accept orders from business entities that are placed by phone, via a faxed invoice, via a mailed order, etc. In one or more embodiments of the invention, each vendor is operatively connected to a network (118).

In one or more embodiments of the invention, a business entity (112) is any entity organized in order to offer goods for sale to customers (not shown). A business entity may include, but is not limited to, personnel, inventory, and a physical location (e.g., a store in a shopping complex). For example, a business entity may be a bicycle shop sells bicycles and related merchandise. In one or more embodiments of the invention, a business entity (112) includes one or more computing devices.

In one or more embodiments of the invention, a computing device is any device and/or any set of devices capable of electronically processing instructions and that includes at least the minimum processing power, memory, input and output device(s), and network connectivity in order to contribute to the performance of at least some portion of the functions described in accordance with one or more embodiments of the invention. Examples of computing devices include, but are not limited to, a server (e.g., a blade-server in a blade-server chassis), a virtual machine (VM), a desktop computer, a mobile device (e.g., laptop computer, smart phone, personal digital assistant, tablet computer, and/or any other mobile computing device), and/or any other type of computing device with the aforementioned minimum requirements.

In one or more embodiments of the invention, a BMA (114) executes on one or more computing devices of the business entity (112). In one or more embodiments of the invention, a BMA (114) is any software designed to be used by a business entity to manage various aspects of the business in which the business entity is engaged. In one or more embodiments of the invention, the BMA (114) is a software application written in any programming language that includes instructions stored in any non-transitory computer readable medium which, when executed by one or more processors in a computing device (e.g., a computing device of a business entity (112)), enable the computing device to perform the functions described in accordance with one or more embodiments of the invention.

In one or more embodiments of the invention, the BMA (114) is obtained from a software provider and installed and executed on one or more computing devices of the business entity. In one or more embodiments of the invention, the BMA (114) is provided by an application service provider, such as a software as a service (SaaS) provider. For example, the BMA (114) may be operated by the application service provider and accessed by the business entity (112) on a subscription basis. In order to make use of a BMA (114), a business entity (112) may agree to sign a license agreement in which the terms of use for the BMA (114) are outlined. By signing such an agreement, a business entity (112) may be bound to the terms of the license agreement as a prerequisite for using the BMA software. In one or more embodiments of the invention, the BMA (114) may be any application for managing an aspect of the operations of a business entity (112), including managing, at least in part, information related to the inventory of a business entity.

The BMA (114) may include functionality to process and/or store data corresponding to the inventory of a business entity (112). The BMA may also include functionality to receive input from the business entity. For example, the BMA may be configured to receive inventory item information when an employee of the business entity uses a bar code scanner operatively connected to the computing device on which the BMA executes to scan the barcode of an item acquired from a vendor (102, 104).

In one or more embodiments of the invention, the BMA (114) is operatively connected to an inventory data repository (116). In one or more embodiments of the invention, a data repository is any type of storage unit and/or device (e.g., a file system, database, collection of tables, or any other storage mechanism) for storing data/information. Specifically, the inventory data repository may include hardware and/or software. Further, the inventory data repository may include multiple different storage units and/or devices. The multiple different storage units and/or devices may or may not be of the same type or located at the same physical site. In one or more embodiments of the invention, the data repository is included as a part of the computing device on which the BMA (114) executes. In other embodiments of the invention, the inventory data repository is a stand-alone repository that is accessible, at least, by the BMA.

In one or more embodiments of the invention, the data in the inventory data repository (116) includes inventory item information (not shown). In one or more embodiments of the invention, inventory item information is any information related to an item in the inventory of a business entity (112). For example, if a barcode scanner is used to enter inventory information into the BMA (114), the BMA may store the barcode information in the inventory data repository, along with other pertinent information such as the date and time the item was entered, a name/description of the item, etc. In one or more embodiments of the invention, inventory item information also includes information related to the purchase price and time, as well as sales price and time when the item is subsequently sold by the business entity (112).

In one or more embodiments of the invention, and discussed further in the description of FIG. 2A below, in one or more embodiments of the invention, the business entity (112) has chosen to use an inventory recommendation tool (146). In such embodiments, the inventory recommendation tool may be accessed, at least in part, via the BMA (114) of the business entity (112).

In one or more embodiments of the invention, one or more business entities may be classified into one or more business categories (106), and may thus be classified as similar businesses (e.g., similar business A (108), similar business X (110)). In one or more embodiments of the invention, a business category is any characteristic or set of characteristics (not shown) of a business entity that the business entity may share with other business entities. Thus, a grouping of businesses based on the one or more shared characteristics may be referred to as a business category (XXX). For example, a business category may be a logical grouping of business entities that: (i) sell office paper products; and (ii) are located within 27 miles of Scranton, Ohio. In one or more embodiments of the invention, a business category that includes more than one characteristic is referred to as a category set.

In one or more embodiments of the invention, a similar business (108, 110) is substantially similar to the above-described business entity (112). However, as shown in FIG. 1, similar businesses may be considered business entities that fall within a business category (106). In one or more embodiments of the invention, each similar business includes a BMA (not shown), which is used to manage, at least in part, the inventories of the similar businesses. The BMA of each similar business may execute on a computing device of the similar business (108, 110) and may be operatively connected to the inventory recommendation tool (146) via a network (118).

In one or more embodiments of the invention, a network (118) is a collection of one or more network devices (not shown) that facilitates network connectivity for one or more operatively connected devices (e.g., computing devices of the business entity (112), the one or more similar businesses, etc.). In one or more embodiments of the invention, the network (118) may be all or a portion of a computer network. A computer network may include a datacenter network, a wide area network, a local area network, a wireless network, a cellular phone network, or any other suitable network that facilitates the exchange of information from one part of the network to another. The network (118) may be coupled with or overlap with the Internet. In one or more embodiments of the invention, devices connected to the network have a network connection.

In one or more embodiments of the invention, also operatively connected to the network (118) is an inventory recommendation tool (146). In one or more embodiments of the invention, the inventory recommendation tool (146) executes on one or more network-connected computing devices. In one or more embodiments of the invention, the inventory recommendation tool (146) is also operatively connected, via the connection to the network (118), to the BMA (114) executing on a computing device of the business entity (112), to the BMAs of each of the similar businesses (108, 110), and to each of the vendors (102, 104). In one or more embodiments of the invention, the inventory recommendation tool (146) is a software application, or collection of software applications written in any programming language that includes instructions stored in any non-transitory computer-readable medium which, when executed by one or more processors in a computing device, enable the computing device to perform the functions described in accordance with one or more embodiments of the invention. In one or more embodiments of the invention, the inventory recommendation tool (146) is operated by an application provider (not shown) from which a business entity (112) obtained a BMA (e.g., BMA (114)). In other embodiments, the inventory recommendation tool (146) is operated by a third party that is neither the business entity nor a provider of the BMA.

In one or more embodiments of the invention, the inventory recommendation tool (146) includes functionality to obtain, via the network (118), inventory information related to the business entity (112) and one or more similar businesses (108, 110). For example, inventory information may be obtained from the BMA of the business entity as well as from the BMAs of the similar businesses. In one or more embodiments of the invention, the inventory recommendation tool (146) includes functionality to provide inventory recommendations and pricing recommendations to the business entity (112) based on the inventory item information obtained from the business entity, the business inventory item information obtained from the one or more similar businesses, and/or any combination thereof. For example, the inventory recommendation tool (146) may be configured to provide the business entity (112) with inventory recommendations such as which items sold by the business entity are selling with the highest profit margin. As another example, the inventory recommendation tool may be configured to provide the business entity with inventory recommendations such as which items are the best sellers at similar businesses in the same geographic region. As a third example, the inventory recommendation tool may be configured to provide with information as to what selling price for a given item might be most advantageous (e.g., balancing profit margin vs. sales time).

In one or more embodiments of the invention, the inventory recommendation tool (1416) includes a categorization module (150). In one or more embodiments of the invention, a categorization module (150) is any hardware (e.g., circuitry), software, firmware, and/or any combination thereof that includes functionality to perform functionality (e.g., categorization operations) related to the categorization of business entities (e.g., as similar businesses in a business category) and/or inventory items.

Categorization of business entities may be based on information provided by a business entity (112) self-defining as part of one or more categories, and/or information obtained related to items in the inventory of a business (e.g., similar business (108, 110), business entity (112)). In one or more embodiments of the invention, the categorization module (150) includes functionality to, whenever a business entity (112) seeks to begin using the inventory recommendation tool (146), present the business entity (e.g., via user interface presented by the BMA of the business entity) with one or more queries related to one or more business categories for which the business entity (112) seeks inventory recommendations. The queries may be used by the categorization module (150) to determine a category set in which the business entity (112) is interested. The category set may be used to define the business category (106) in which to group one or more similar businesses (108, 110) from which inventory recommendations may, at least in part, be derived. For example, a dress shop, when queried by the categorization module, may indicate being interested in inventory recommendations related to dresses and in businesses in the local area. In such an example, the categorization module may include functionality to determine a categorization set defines a business category of dress shops that are local (e.g., a group of similar businesses such as local area dress shops). Any number of similar businesses (108, 110) may fall within the business category, and inventory item information obtained from each BMA of the set of similar businesses within the business category may be used to generate one or more inventory recommendations for the dress shop. Business category information may be stored in the inventory recommendation tool data repository (120), which is described below.

In one or more embodiments of the invention, the categorization module also includes functionality to perform one or more categorization operations related to inventory items (e.g., inventory categorization operation). Inventory items may be entered into a BMA by a business entity (112) and/or any of the similar businesses (108, 110). In one or more embodiments of the invention, inventory items, when entered into a BMA, are stored with, at least, information that allows the categorization module (150) of the inventory recommendation tool (146) to identify the item upon obtaining information related to the inventory from the BMA via the network (118). For example, a barcode identifying the item may be scanned into the BMA, which may allow the categorization module to use the barcode information to identify the item. In such an example, the categorization module may include functionality to use the identifying information to obtain additional information related to the item that may be used when categorizing the inventory item, such as a description, product type, etc. Items may be placed by the categorization module (150) into any number of inventory item categories. For example, a pair of women's shoes may be placed in a female apparel category, a footwear category, a geographic location category, a price range category, etc. Inventory category information may be stored in the inventory recommendation tool data repository (120), which is described below.

In one or more embodiments of the invention, the inventory management module (152) is any hardware, software, firmware, and/or any combination thereof that includes functionality to perform operations (e.g., inventory management operations) related to obtaining and/or analyzing information corresponding to inventory items obtained from the BMA of the business entity and/or one or more similar businesses. For example, the inventory management module may obtain from one or more BMAs and store in the inventory recommendation tool data repository (120) information related to item descriptions, purchase and sales prices, time of purchase, time of sale, geographic location information, etc. In one or more embodiments of the invention, the inventory management tool also includes functionality to use one or more pieces of inventory item information to perform an analysis and obtain additional pieces of information related to an inventory item. For example, the purchase price and the sales price may be used by the inventory management module to calculate a profit margin for the item. As another example, the purchase time and the sales time may be used to calculate the shelf time for an item (i.e., the amount of time that an item remains in inventory of a business entity).

In one or more embodiments of the invention, the inventory recommendation generator (148) is any hardware, software, firmware, and/or any combination thereof that includes functionality to perform operations related to generating one or more inventory recommendations. In one or more embodiments of the invention, the inventory recommendation module includes functionality to access and use business categorization information, inventory categorization information, and any information obtained by and/or generated by the inventory management module in order to generate inventory recommendations. In one or more embodiments of the invention, the inventory recommendation generator also includes functionality receive and process requests from the BMA (114) of a business entity (112) to generate an inventory recommendation. In such embodiments, requests from the business entity may include one or more parameters that describe at least some aspect of the type of inventory recommendation in which the business entity (112) is interested. For example, a request may include that a business entity is interested in knowing which of the items in the inventory of the business have enjoyed the highest profit margin in the last half-year. As another example, the request may include parameters that indicate that the business entity wishes the inventory recommendation generator to generate a list of inventory items from similar businesses that are geographically near the business entity and have sold the best in the last three months.

In one or more embodiments of the invention, the inventory recommendation tool (146) is operatively connected to the inventory recommendation tool data repository (120), which is substantially similar to the inventory data repository (116), described above. However, instead of merely inventory item information related to the business entity, the inventory recommendation data repository includes functionality to store all of the types of information obtained and/or generated by the inventory recommendation tool and/or any component therein. Non-limiting examples of the types of information stored in the inventory recommendation tool data repository are shown in FIG. 1 and described below.

In one or more embodiments of the invention, the inventory recommendation tool data repository (120) includes inventory item identifiers (122). An inventory item identifier may be any information that allows for identification of an inventory item. Examples of inventory item identifiers include, but are not limited to, barcodes, quick response codes, serial numbers, product numbers, and/or radio frequency identification tag information. In one or more embodiments of the invention, an item identifier (122) may be associated with one or more other types of information stored in the invention recommendation tool data repository (120) that are in any way based on the inventory item.

In one or more embodiments of the invention, the inventory recommendation tool data repository (120) includes item descriptions (124). An item description may refer to any information describing any aspect of a product. Examples of item descriptions include but are not limited to, classification information, color, size, weight, intended use, and/or beneficial qualities of an item.

In one or more embodiments of the invention, the inventory recommendation tool data repository (120) includes purchase prices (126). A purchase price may refer to any information describing the price that a business entity, or similar business, paid a vendor for an item. For example, a shoe store may have purchased one or more pairs of shoes from a shoe vendor at $27.00 per pair.

In one or more embodiments of the invention, the inventory recommendation tool data repository (120) includes sales prices (128). A sales price may refer to any information describing the price at which a business entity, or similar business, sold an item to a customer. For example, a shoe store may have sold one or more pairs of shoes to one or more customers at $72.00 per pair.

In one or more embodiments of the invention, the inventory recommendation tool data repository (120) includes profit margins (130). A profit margin may refer to any information describing difference between a purchase price and a sales price of an item. For example, a shoe store may have purchased one or more pairs of shoes from a shoe vendor at $27.00 per pair, and sold the pairs of shoes to customers for $72.00, meaning that the profit margin may be calculated as $45.00.

In one or more embodiments of the invention, the inventory recommendation tool data repository (120) includes price point information (132). Price point information may refer to any information describing a relationship between the price of a type of inventory item (e.g., a specific brand and type of blue jeans) and one or more of any other metric tracked by the inventory recommendation tool (e.g., how well the item sells, how fast the items sells, the profit margin of an item, etc.). For example, it may be determined that a certain pair of blue jeans sells in large quantities over short timeframes when priced at $60.00, but considerably worse when priced at $70.00. In such an example, the price point information may be used by the inventory recommendation tool to provide price recommendations to a business entity. Such information may be expressed as any number of aggregate data points which, if plotted on a Cartesian coordinate system, would demonstrate increased sales at one or more specific prices (i.e., price points).

In one or more embodiments of the invention, the inventory recommendation tool data repository (120) includes shelf times (134). A shelf time may refer to any information describing the time difference between when an item was obtained by a business entity from a vendor, and the time when the same item was ultimately sold to a customer, or may refer to the time difference between when an inventory item was purchased from a vendor and the present time (e.g., when the item has yet to sell).

In one or more embodiments of the invention, the inventory recommendation tool data repository (120) includes average sales time (136). Average sales time may refer to any information describing the average time taken for a given item to be sold.

In one or more embodiments of the invention, the inventory recommendation tool data repository (120) includes geographic information (138). Geographic information may refer to any information describing the physical location at which an inventory item was sold and/or where the entity that sold the item (e.g., similar business A (108)) is located.

In one or more embodiments of the invention, the inventory recommendation tool data repository (120) includes item relationships (140). An item relationship may refer to any information related to a relationship between inventory items. In one or more embodiments of the invention, the inventory management module (152) of the inventory recommendation tool (146) includes functionality to determine that items of a certain type tend to sell more rapidly and/or at higher prices when sold by a business entity that also sells specific other types of inventory items. For example, a certain type of tennis shoe may sell notably well at business entities that also sell both tennis balls and a certain brand of tennis shoe cleaner.

In one or more embodiments of the invention, the inventory recommendation tool data repository (120) includes business categorization information (142). Business categorization information may refer to any information related to the categorization of a business entity and/or similar business. For example, business categorization information may include information related to choices made by a business entity and obtained by the categorization module that indicate one or more categories in which the business entity is interested. As another example, business categorization information may include information related to the categorization of one or more similar businesses into one or more business categories.

In one or more embodiments of the invention, the inventory recommendation tool data repository (120) includes inventory categorization information (144). Inventory categorization information may refer to any information related to the categorization of inventory items. For example, inventory categorization information may include information such as the fact that a certain inventory item falls into a category of "candy bar" sold in a certain geographic region in a certain price range.

While FIG. 1 shows a configuration of components, other configurations may be used without departing from the scope of the invention. For example, various components may be combined to create a single component. As another example, the functionality performed by a single component may be performed by two or more components. In one or more embodiments of the invention, one or more of the modules and elements shown in FIG. 1 may be omitted, repeated, and/or substituted. Accordingly, embodiments of the invention should not be considered limited to the specific arrangements of modules and elements shown in FIG. 1.

Figure 2A:
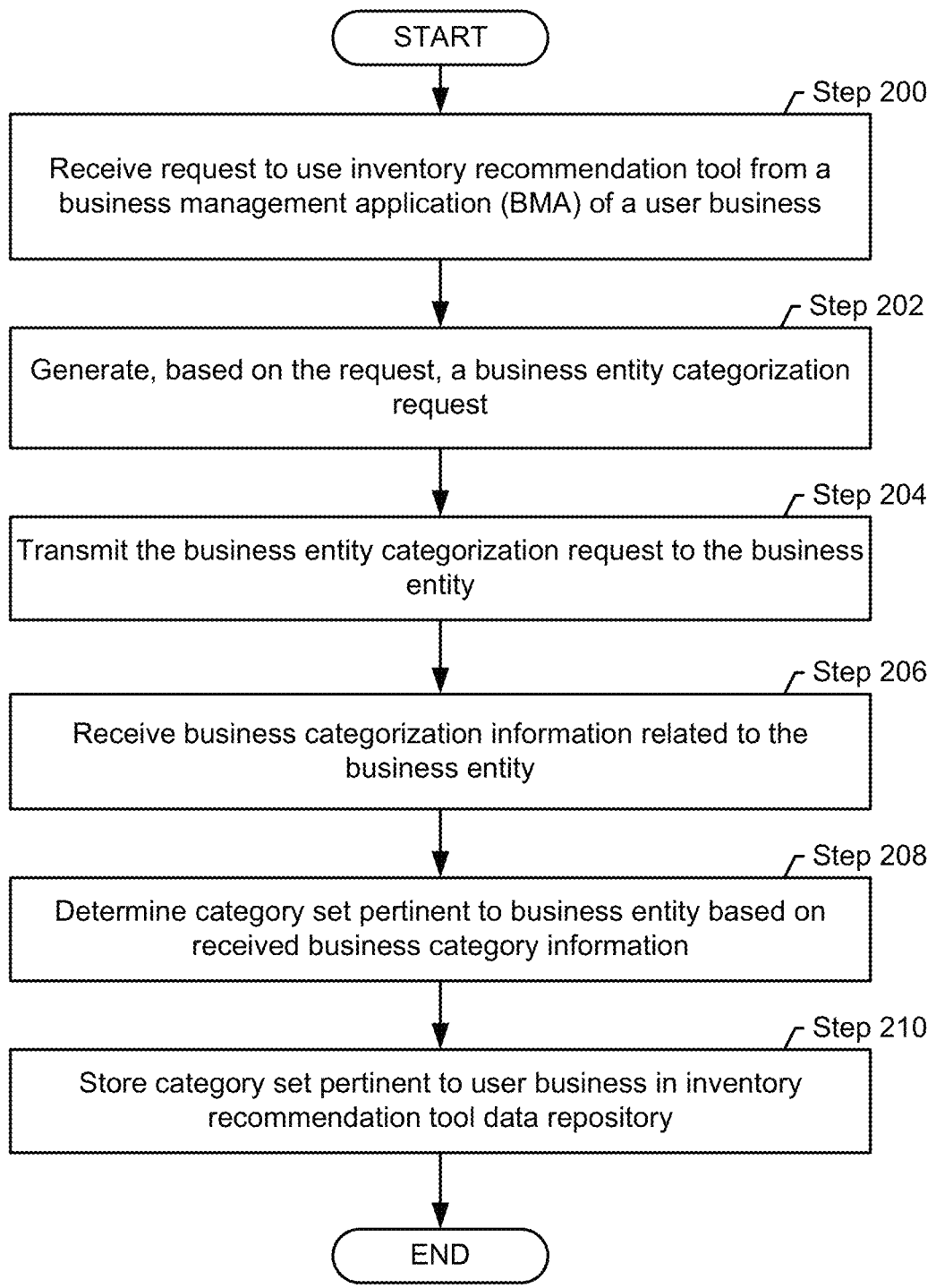
FIGS. 2A and 2B show flowcharts in accordance with one or more embodiments of the invention.
Figure 2B:
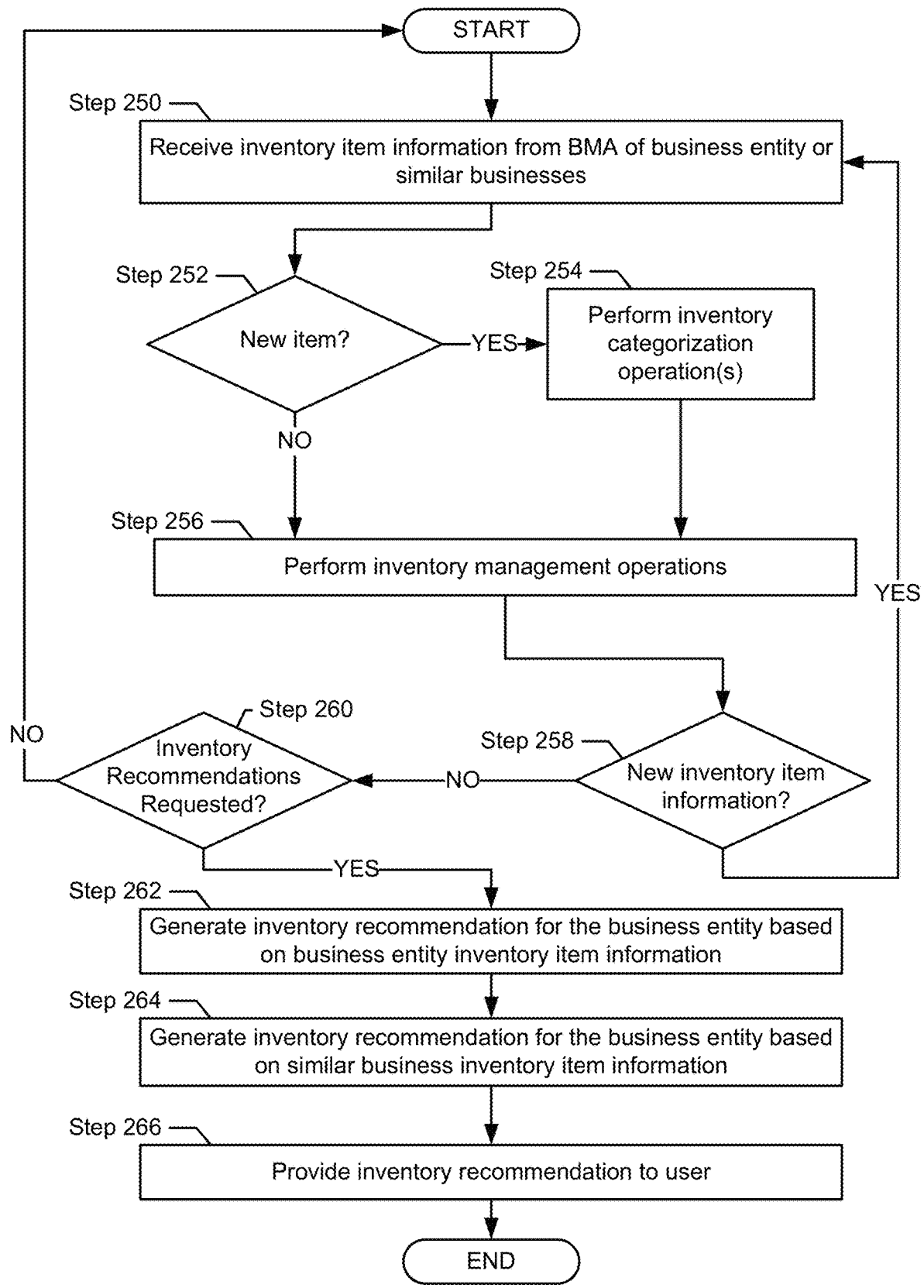

FIGS. 2A and 2B show flowcharts in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2A shows a flowchart describing a method for configuration of an inventory recommendation tool for use by a business entity. In Step 200, an inventory recommendation tool receives a request from a business entity to begin using the inventory recommendation tool. In one or more embodiments of the invention, the request comes from a BMA of the business entity. The request may be received by any means of communication. For example, the request may be received via a network as a series of packets that arrive at a network interface of the computing device on which the inventory recommendation tool executes. In one or more embodiments of the invention, the request indicates that the business entity wishes to begin using the inventory recommendation tool, includes some form of agreement as to the terms and conditions related to the use of the inventory recommendation tool, and may additionally include any other information related to the business entity that is relevant to generating an inventory recommendation for the business entity in accordance with one or more embodiments of the invention.

In Step 202, the inventory recommendation tool generates, in response to the request received in Step 200, a business entity categorization request. In one or more embodiments of the invention, the business entity categorization request is a request that a business entity provide one or more categories in which the business entity either belongs and/or is interested in receiving inventory recommendations (e.g., a category set). The business entity categorization request may include any number of categories arranged in any manner from which the business entity may select. The business entity categorization request may also include a request for the business entity to define any new categories relevant to the business entity but not already represented as a choice.

In Step 204, the business entity categorization request is transmitted to the business entity that requested to use the inventory recommendation tool in Step 200. In one or more embodiments of the invention, the request is transmitted to the business entity in any manner that the business entity is capable of receiving. For example, the request may be transmitted to the BMA of the business entity via a network. As another example, a sales representative of the company offering the inventory recommendation tool may contact the business entity via phone and/or email in order to present the business entity categorization request to the business entity.

In Step 206, in response to the request generated in Step 202 and transmitted in Step 204, the inventory recommendation tool receives business categorization information. In one or more embodiments of the invention, the business categorization information is received via any communication channel. For example, the business categorization information may be received via a similar channel as that through which the request was sent to the business entity, such as from back from the BMA via the network.

In Step 208, a category set is determined based on the received business category information. In one or more embodiments of the invention, the category set is determined (e.g., via a categorization module) by assessing the response from the business entity to determine: (i) which pre-existing categories in which the business entity expressed interest; (ii) any new categories which the business entity wishes to have created; and (iii) any other information associated with the business entity that may be relevant to a categorization of the business entity (e.g., geographic location of the business entity). Said another way, a category set, as determined by the inventory recommendation tool, includes one or more business categories and/or sub-categories of those business categories. In one or more embodiments of the invention, the results of the aforementioned assessment are grouped into a category set. For example, if a coffee shop located in Utah indicates being interested in the categories of "coffee shops", "pastry shops", and a refinement of "gourmet coffee shops", then the category set for the business entity may include each of the aforementioned categories as well as an identifier of the business entity and the geographic location of the business entity.

In Step 210, the category set pertinent to the business entity is stored in the inventory recommendation tool data repository (e.g., as business categorization information). In one or more embodiments of the invention, storing the category set includes modifying the storage medium of the data repository to reflect computer readable information that represents the category set.

FIG. 2B shows a flowchart describing a method for providing an inventory recommendation to a business entity. In one or more embodiments of the invention, before providing a business entity with an inventory recommendation, the business entity has sent a request indicating a desire to use the inventory recommendation tool, and has been associated with a category set by the inventory recommendation tool (discussed above in the description of FIG. 2A).

In Step 250, an inventory recommendation tool receives inventory item information from a business entity that requested to use the inventory recommendation tool (i.e., in Step 200 of FIG. 2A), and/or from a similar businesses. In one or more embodiments of the invention, the similar businesses are associated with the category set (see description of Step 208 of FIG. 2A, above) in which the business entity is interested. In one or more embodiments of the invention, inventory item information includes any information related to an inventory item provided to the inventory recommendation tool. Inventory item information may be related to a new item (i.e., an item not previously known to the inventory recommendation tool to be in the inventory of a business entity and/or similar business). Inventory item information may include information related to existing and/or former inventory items, such as the price an item sold at, the fact that an item still has not sold, etc. In one or more embodiments of the invention, inventory item information is received via any communication channel capable of transmitting information related to inventory items. For example, inventory item information may be stored in an inventory data store operatively connected to the BMA of a business entity and/or similar business. In such an example, the inventory recommendation tool may include functionality to periodically (e.g., once a day, at 3:00 a.m.) pull the inventory item information from the BMA via a network.

In Step 252, a determination is made as to whether the inventory item information received in Step 250 is related to a new item or an existing item. A new item may be an inventory item that the inventory recommendation tool was not aware of being in the inventory of the business entity or similar business from which the inventory item information was received. If the inventory item information relates to a new item, the process proceeds to Step 254. However, if the inventory item information is related to an existing item, then the process proceeds to Step 256.

In Step 254, the inventory recommendation tool performs one or more inventory categorization operations. In one or more embodiments of the invention, an inventory categorization operation is an operation related to the inventory item for which information is received in Step 250 that determines one or more ways to classify the new inventory item.

In one or more embodiments of the invention, inventory items may be associated with the business entity or similar business from which the inventory item information was received, which, in turn, allows the inventory item to be associated with the one or more business categories included in the category set associated with the business entity or similar business.

The inventory recommendation tool may also categorize inventory items based on the inventory item information received from the business entity and/or similar business. For example, the inventory item information may include an identifier that identifies products of a certain type (e.g., table cloth). The inventory recommendation tool may also include functionality to use inventory item information to obtain information related to inventory items from external sources (e.g., vendors) when categorizing the inventory items. For example, if the received inventory item information included a barcode identifying the item, then the inventory recommendation tool may use the barcode in a query sent to the vendor (i.e., supplier) from which the business entity or similar business obtained the item. In such an example, information from the vendor may include product descriptions and/or classifications that the inventory recommendation tool may use to properly categorize the inventory item. In one or more embodiments of the invention, inventory categorization operations result in inventory categorization information being stored in the inventory recommendation tool data repository.

In Step 256, the inventory recommendation tool performs one more inventory management operations. In one or more embodiments of the invention, an inventory management operation is any operation related to a specific inventory item. Performing inventory management operations may include storing information in the inventory recommendation tool data repository. Inventory item management operations may include, but are not limited to, storing an item identifier, obtaining, generating, and/or storing an item description, storing purchase and/or sales prices, calculating profit margin, calculating price point information, storing purchase time and/or sales time, calculating shelf time, storing geographic information related to the inventory item (e.g., where is the business entity selling the item located), and/or determining relationships between an inventory and one or more other inventory items to create item relationships.

In Step 258, the inventory recommendation tool determines if new inventory item information has been sent and/or otherwise been made available to the inventory recommendation tool. If new inventory item information has been received, the process returns to Step 250. If no new inventory item information has been received, then the process proceeds to Step 260.

In Step 260, the inventory recommendation tool determines if the business entity has requested an inventory recommendation. In one or more embodiments of the invention, an inventory recommendation request may be received via any communication channel. For example, the business entity may use an add-on feature of the BMA to generate and transmit a request for an inventory recommendation to the inventory recommendation tool via an email. If an inventory recommendation request has been received by the inventory recommendation tool, the process proceeds to Step 262. Otherwise the process returns to Start and begins again.

In Step 262, the inventory recommendation tool generates an inventory recommendation based on business entity inventory item information. In one or more embodiments of the invention, an inventory recommendation related to one or more inventory items of a business entity may be used by the business entity to help the business entity make decisions regarding future inventory item acquisitions. Examples of inventory recommendations based on business entity inventory item information include, but are not limited to: a list representing inventory items of the business entity with the highest profit margin; a list of best sellers; and a list of items that have the shortest shelf time. Lists of items may be ranked using any ranking algorithm. For example, lists may be ranked from highest to lowest, lowest to highest, etc.

In Step 264, the inventory recommendation tool generates an inventory recommendation for the business entity based on similar business inventory item information. In one or more embodiments of the invention, an inventory recommendation information based on, in part, one or more inventory items of a similar business may be provided to business entity to help the business entity make decisions regarding future inventory item decisions. Business entity inventory recommendation information may be generated using inventory item information received from the business entity. Examples of inventory recommendations based on similar business inventory item information include, but are not limited to: a list representing inventory items of similar businesses with the highest profit margin; a list of best sellers; and a list of items that have the shortest shelf time; and information related to a the price point at which a given inventory item sells most often. In one or more embodiments of the invention, an inventory recommendation based on inventory information from the one or more similar businesses includes one or more recommended prices at which to sell a given item. Inventory recommendations based on similar business inventory item information may be filtered to include only results within a selected geographic region. In one or more embodiments of the invention, inventory recommendations based on similar business inventory item information are aggregated and anonymized such that the business entity is not able to specifically associate any information included in the inventory recommendation with any specific similar business. One of ordinary skill in the art and having the benefit of this disclosure will recognize that, for the inventory recommendations discussed in Step 262 and 264, the business entity need not necessarily have any pre-existing relationship with the any vendor that sells any product that may be recommended by the inventory recommendation tool.

In Step 266, inventory recommendations are provided to the business entity by the inventory recommendation tool. In one or more embodiments of the invention, any communication channel may be used to provide the inventory recommendations to the business entity. For example, the inventory recommendations may be transmitted via a network to a computing device of the business entity on which a BMA executes. In such an example, the BMA may include functionality to display the inventory recommendations to a person associated with the business entity via causing the inventory recommendations to be output to a display device.

Figure 3A:
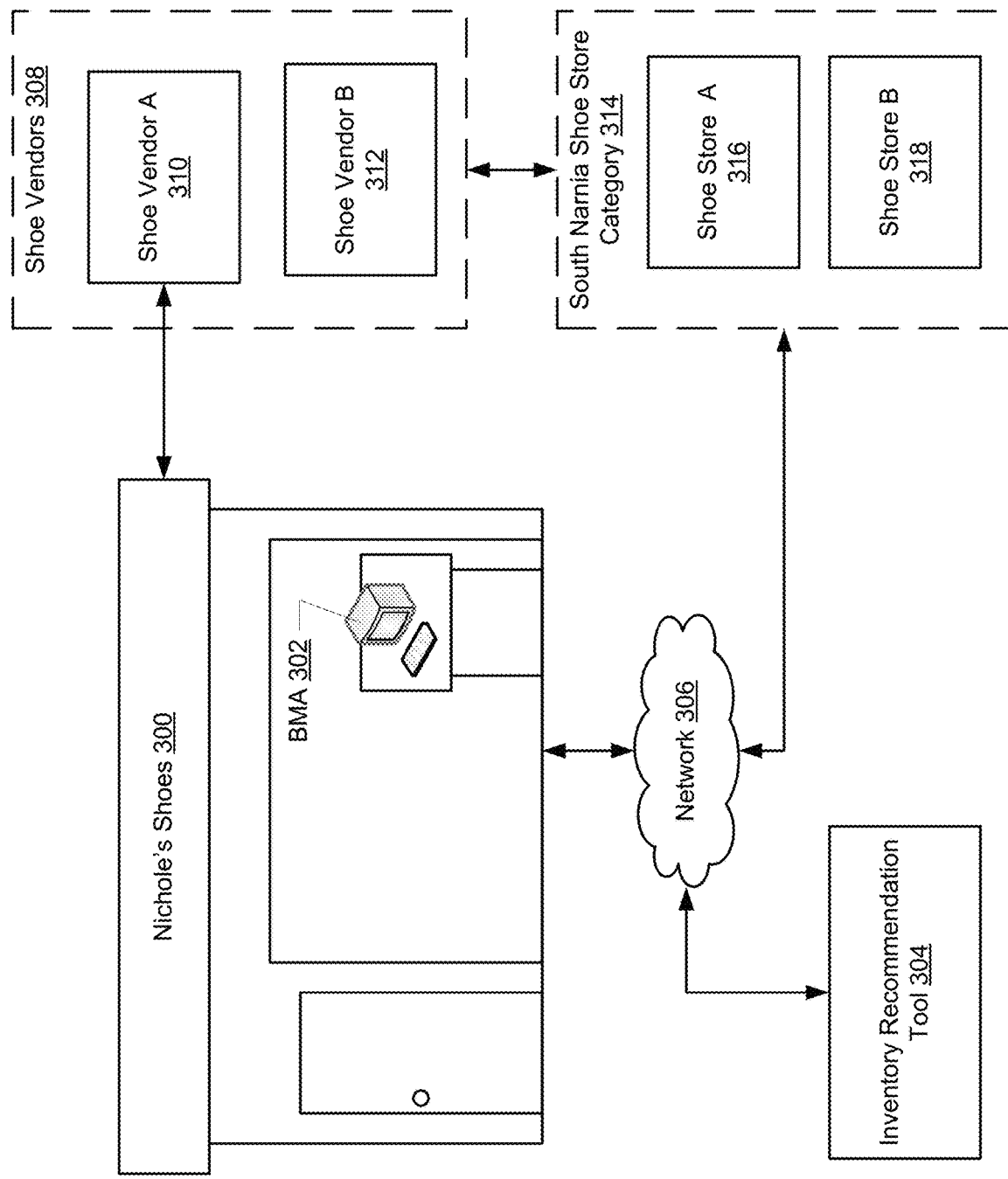
Figure 3B:
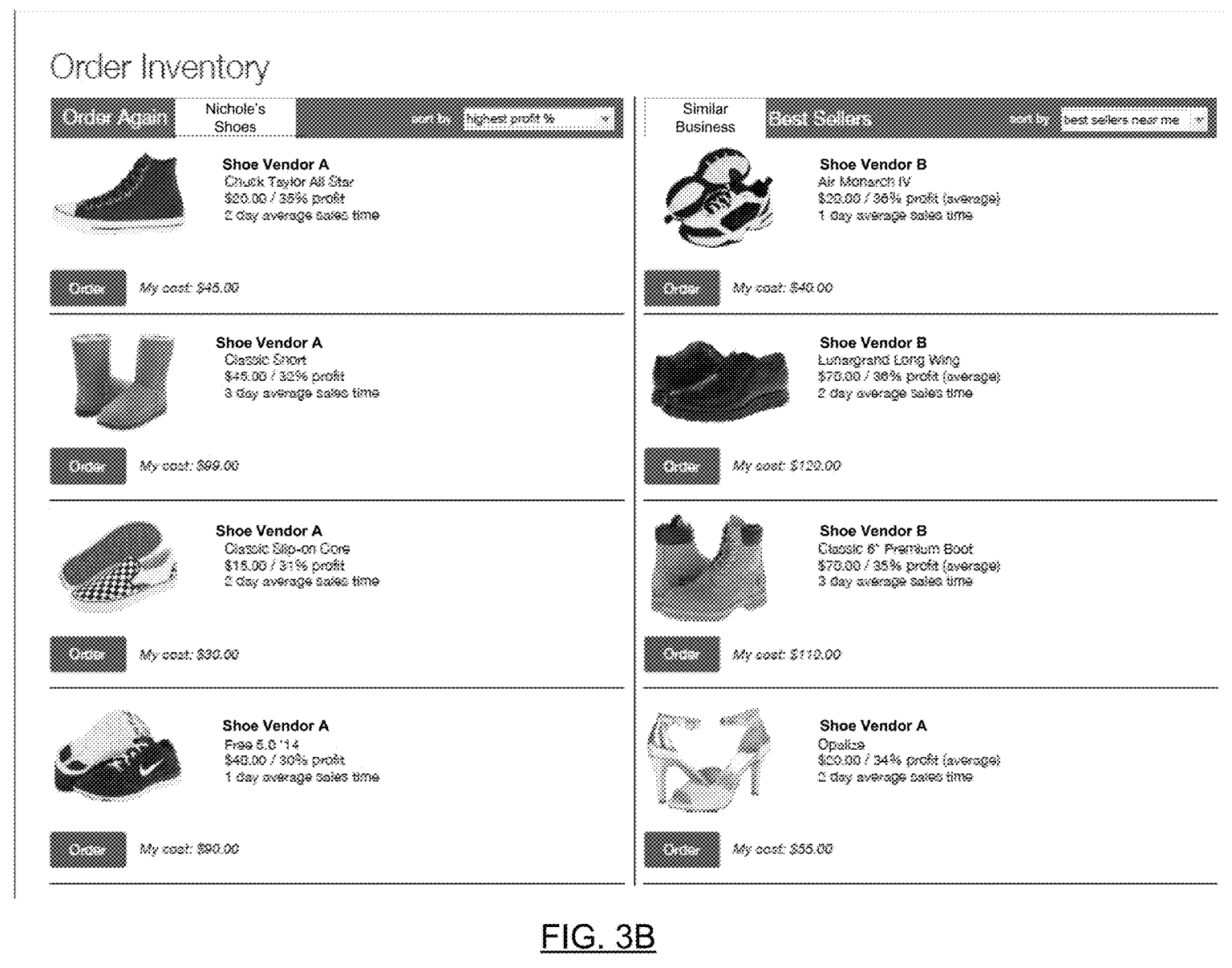

FIGS. 3A and 3B show an example in accordance with one or more embodiments of the invention. The following example is for explanatory purposes only and not intended to limit the scope of the invention.

Referring to FIG. 3A, consider a scenario in which Nichole's Shoes (300) is a shoe store located in the south of Texas. Nichole's Shoes (300), a shoe store, has a relationship with only one shoe vendor (shoe vendor A (310)) of a group of possible shoe vendors (308) that also includes shoe vendor B (312). Nichole's Shoes also possesses a computing device on which a BMA (302) executes. The computing device on which the BMA executes is operatively connected to a network (306). Also operatively connected to the network (306) are an inventory recommendation tool (304) and each similar business in the south Narnia shoe store category (314), including shoe store A (316) and shoe store B (318).

In such a scenario, Nichole, the owner of Nichole's Shoes (300) has previously used the BMA (302) to request to begin using the inventory recommendation tool (304). To that end, Nichole also provided the inventory recommendation tool with business categorization information (not shown), which was used by the inventory recommendation tool (304) to determine a category set in which Nichole's Shoes (300) is interested. In the present scenario, the inventory recommendation tool (304) determines that the category set includes shoe stores and is geographically limited to south Narnia. The only stores that fall within the category set are shoe store A (316) and shoe store B (318). The category set in which the inventory recommendation tool (304) determines Nichole's Shoes (300) to be interested in is stored as business categorization information in a data repository (not shown) operatively connected to the inventory recommendation tool.

The inventory recommendation tool (304) is also used by shoe store A (316) and shoe store B (318). Accordingly, inventory item information related to inventory items of Nichole's Shoes (300), shoe store A (316), and shoe store B (318) is provided from the BMA of each of those entities to the inventory recommendation tool via the network. This includes information related to new inventory items acquired by the three shoe stores, as well as on-going information related to items already in inventory, or that have been sold and thus are no longer in inventory. Each time new item information is received, the new item is subjected to one or more categorization operations to determine one or more categories that the item may be associated with. Once a new item has been categorized, or if information is received by the inventory recommendation tool for existing and/or former inventory items, the inventory recommendation tool performs one or more inventory management operations. Specifically, in the present scenario, the inventory recommendation tool obtains and then stores in the operatively connected data store, at least, information related to purchase price, sales price, and average sales time for each inventory item. Purchase price and sales price are then used to calculate profit margin for each item. Average sales time is used to calculate which items are the best sellers.

After some time, Nichole sends a request to the inventory recommendation tool requesting an inventory recommendation based on the previously provided category set. Specifically, Nichole uses the BMA (302) to send a request to be provided with an inventory recommendation related to the shoes sold by Nichole's Shoes with the highest profit margin (with highest profit margin first), and also an inventory recommendation related to shoes sold by similar businesses (e.g., shoe store A (316), shoe store B (318)) that are the best sellers (with the best seller listed first).

Once the request is received, the inventory recommendation tool (304) first generates the inventory recommendation in response to the request related to shoes sold by Nichole's shoes by obtaining from the data store (not shown) all information related to profit margin of shoes sold by Nichole's. Next, the inventory recommendation tool orders the shoes such that the first listing is the shoe with the highest profit margin, the second shoe listed is the shoe with the second highest profit margin, etc.

Next, the inventory recommendation tool (304) generates the inventory recommendation in response to the request related to shoes sold by similar businesses that are the best sellers by obtaining the average sales time information related to shoes sold by shoe store A (316) and shoe store B (318). Next, the inventory recommendation tool (304) orders the shoes such that the first listing is the shoe with the lowest average sales time, the second shoe listed is the shoe with the second shortest average sales time, etc.

Once both of the requested inventory recommendations are generated, the inventory recommendation tool (304) formats the data into a graphical display for output on a display device operatively connected to a computing device on which a BMA (302) executes. Then the inventory recommendation tool transmits the inventory recommendations to the BMA (302) of Nichole's Shoes via the network.

FIG. 3B shows the inventory recommendations as presented to Nichole's Shoes. As may be seen in FIG. 3B, the list on the left includes the aforementioned list of shoes sold by Nichole's Shoes that have the highest profit margin. With this information, Nichole may make informed decisions as to what items may be best to continue to buy from shoe product vendor A. The list on the right includes the aforementioned list of shoes sold by similar businesses (i.e., shoe stores in south Narnia) that are the best sellers. One thing Nichole notices immediately is that the top three sellers for similar businesses turn out to be supplied by shoe vendor B, from which Nichole's currently buys no shoes. Thus Nichole decides to begin a relationship with shoe vendor B in order to obtain a wider variety of top sellers to directly compete with the similar businesses. However, because the inventory recommendations provided to Nichole's Shoes do not include any information related to the similar businesses, shoe store A and shoe store B are effectively anonymous from the perspective of Nichole's Shoes.

Figure 4:
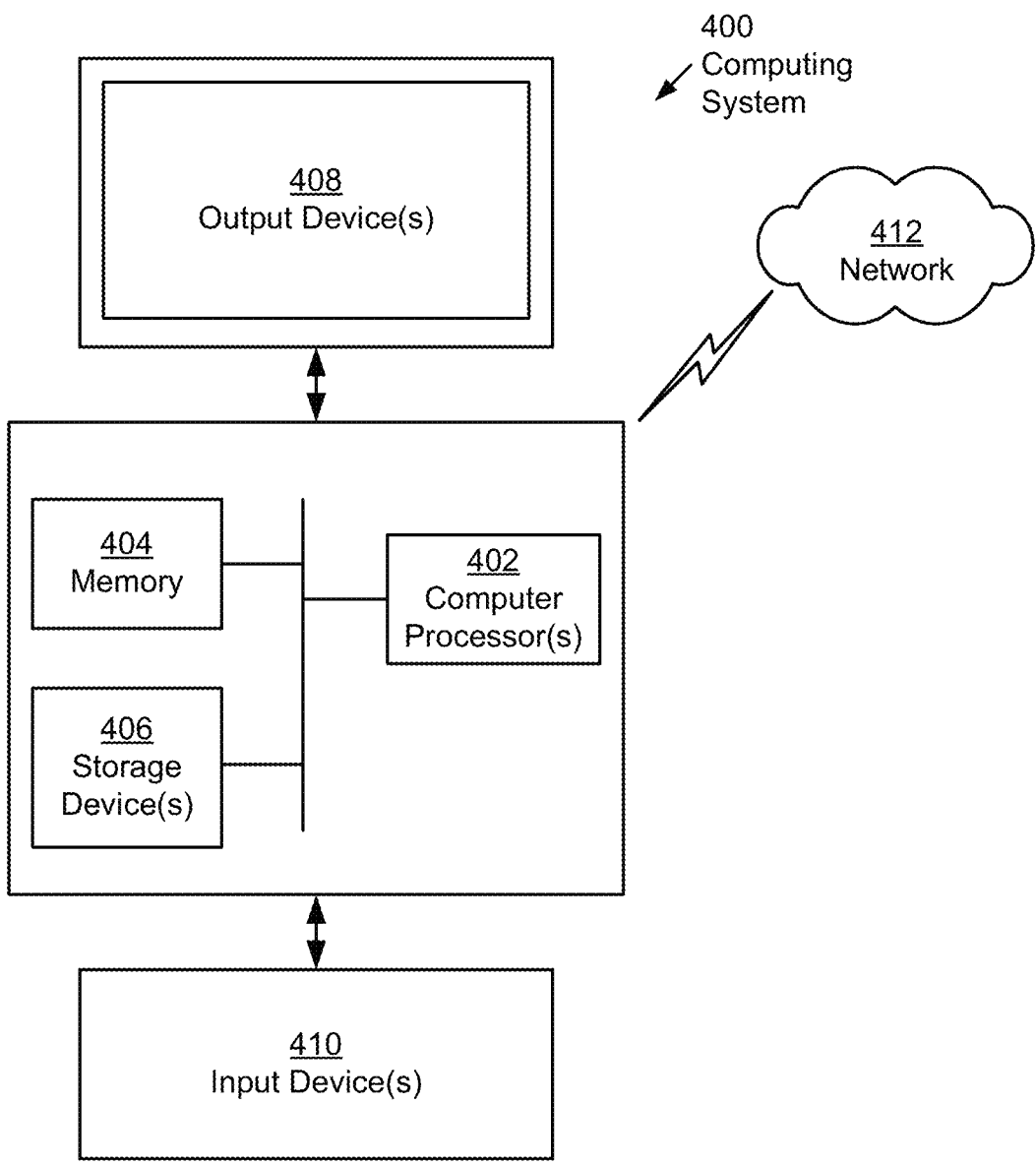
FIG. 4 shows a computing system in accordance with one or more embodiments of the invention.

Embodiments of the invention may be implemented on a computing system. Any combination of mobile, desktop, server, embedded, or other types of hardware may be used. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s)

(406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (414). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    receiving, by an inventory recommendation tool from a business management application (BMA) used by a business entity, an inventory recommendation tool use request to use the inventory recommendation tool;
    determining, by a categorization module of the inventory recommendation tool, a business category set based on a business entity categorization information,
        wherein the business category set comprises a business category that includes more than one characteristic;
    storing, by the inventory recommendation tool, the business category set as a data structure in an inventory recommendation tool data repository;
    receiving, by the inventory recommendation tool, inventory item information related to an inventory item from another business entity,
        wherein the inventory item information is obtained by scanning at least one of barcodes, quick response codes, serial numbers, product numbers, and radio frequency identification tag information;
    performing, by the categorization module, an inventory categorization operation based on the inventory item information to obtain inventory categorization information,
        wherein the inventory categorization operation makes a classification decision to place the inventory item into two inventory item categories;
    storing, by the inventory recommendation tool, the inventory categorization information in the inventory recommendation tool data repository;
    performing, by an inventory management module of the inventory recommendation tool, an inventory management operation based on the inventory item information to obtain inventory management information;
    storing, by the inventory recommendation tool, the inventory management information in the inventory recommendation tool data repository;
    after determining that the inventory item information includes new inventory item information, repeating at least the steps of receiving the inventory item information and performing the inventory management operation;
    receiving, by the inventory recommendation tool and from the BMA, an inventory recommendation request;
    obtaining, by the inventory recommendation tool, information associated with a plurality of inventory items corresponding to the business category set;
    obtaining, by the inventory recommendation tool, information associated with a plurality of inventory items corresponding to the business entity;
    generating, by an inventory recommendation generator of the inventory recommendation tool and in response to the inventory recommendation request, an inventory recommendation corresponding to the business category set for a first inventory item category;
    generating, by the inventory recommendation generator and in response to the inventory recommendation request, an inventory recommendation corresponding to the business entity for a second inventory item category;
    combining, by the inventory recommendation tool, the inventory recommendation for the first inventory item category and the second inventory item category to enhance the inventory recommendation to the BMA used by the business entity; and
    presenting, by the inventory recommendation tool, the inventory recommendation to a graphical user interface,
        wherein the inventory recommendation displays the inventory item, which is from the other business entity and is from a vendor of the other business entity, and
        wherein the vendor of the other business entity receives an order from the business entity in response to the inventory recommendation;
    presenting, in the graphical user interface, an image of the inventory item;
    presenting, in the graphical user interface, a name of the vendor of the inventory item beside the image of the inventory item;
    presenting, in the graphical user interface, a name of the inventory item below the name of the vendor and beside the image of the inventory item;
    presenting, in the graphical user interface, a profit in dollars and an average profit margin percentage below the name of the inventory item and beside the image of the inventory item;
    presenting, in the graphical user interface, an average sales time in days below the profit and average profit margin percentage and beside the image of the inventory item;
    presenting, in the graphical user interface, a cost of the inventory item below the average sales time and below the image of the inventory item;
    presenting, in the graphical user interface, the inventory recommendation as one of a plurality of inventory recommendations in a tabular format sorted by shortest average sales time;

presenting, in the graphical user interface, an order button with the inventory item that, when selected triggers a process of ordering of the inventory item; and placing an order for the inventory item with the order button.

2. The method of claim 1, further comprising, before receiving the inventory item information:

generating, based on the inventory recommendation tool use request, a business entity categorization request;

transmitting the business entity categorization request to the BMA; and receiving, in response to the business entity categorization request, the business entity categorization information.

3. The method of claim 1, wherein generating the inventory recommendation corresponding to the business category set comprises:

ranking the plurality of items in the inventory item set based on the average sales time for each item of the plurality of items;

ranking the plurality of items based on a profit margin for each of the items of the plurality of items; and ranking the plurality of items based on a shelf time for each of the items of the plurality of items.

4. The method of claim 3, further comprising:

before ranking the plurality of items, filtering the plurality of items to include a subset of the plurality of items within a threshold distance of a location of the business entity.

5. The method of claim 1, wherein generating the inventory recommendation corresponding to the business entity comprises:

ranking the plurality of items based on the average sales time by the business entity for each item of the plurality of items;

ranking the plurality of items based on a profit margin for each of the items of the plurality of items; and ranking the plurality of items based on a shelf time for each of the items of the plurality of items.

6. The method of claim 1, wherein the inventory management information consists of at least one selected from a group consisting of an item identifier, an item description, a purchase price, a sales price, a profit margin, price point information, a shelf time, the average sales time, geographic information, and item relationship information.

7. The method of claim 1, wherein the inventory recommendation is provided to the user via display on a display device operatively connected to a computing device on which the BMA used by the business entity executes.

8. A system comprising:

a computer processor and memory;

an inventory recommendation tool data repository;

a business management application (BMA) used by a business entity; and an inventory recommendation tool operatively connected to the inventory recommendation data repository and the business management application (BMA), wherein the inventory recommendation tool is stored in memory and executes on the computer processor configured to:

receive, from another business entity, an inventory recommendation tool use request to use an inventory recommendation tool, determine, by a categorization module of the inventory recommendation tool, a business category set based on a business entity categorization information, wherein the business category set is a business category that includes more than one characteristic, store the business category set as a data structure in the inventory recommendation tool data repository, receive, from the BMA, inventory item information related to an inventory item, wherein the inventory item information is obtained by scanning at least one of barcodes, quick response codes, serial numbers, product numbers, and radio frequency identification tag information, perform, by the categorization module, an inventory categorization operation based on the inventory item information to obtain inventory categorization information, wherein the inventory categorization operation makes a classification decision to place the inventory item into two inventory item categories, store the inventory categorization information in the inventory recommendation tool data repository, perform, by an inventory management module of the inventory recommendation tool, an inventory management operation based on the inventory item information to obtain inventory management information, store the inventory management information in the inventory recommendation tool data repository, after determining that the inventory item information includes new inventory item information, repeat at least the steps of receiving the inventory item information and performing the inventory management operation, receive, from the BMA, an inventory recommendation request, obtain information associated with a plurality of inventory items corresponding to the business category set, obtain information associated with a plurality of inventory items corresponding to the business entity, generate, by an inventory recommendation generator of the inventory recommendation tool and in response to the inventory recommendation request, an inventory recommendation corresponding to the business category set for a first inventory item category, generate, by the inventory recommendation generator and in response to the inventory recommendation request, an inventory recommendation corresponding to the business entity for a second inventory item category, combine the inventory recommendation for the first inventory item category and the second inventory item category to enhance the inventory recommendation to the BMA used by the business entity, and present the inventory recommendation to a graphical user interface, wherein the inventory recommendation displays the inventory item, which is from the other business entity and is from a vendor of the other business entity, and wherein the vendor of the other business entity receives an order from the business entity in response to the inventory recommendation;

present, in the graphical user interface, an image of the inventory item, present, in the graphical user interface, a name of the vendor of the inventory item beside the image of the inventory item, present, in the graphical user interface, a name of the inventory item below the name of the vendor and beside the image of the inventory item, present, in the graphical user interface, a profit in dollars and an average profit margin percentage below the name of the inventory item and beside the image of the inventory item, present, in the graphical user interface, an average sales time in days below the profit and average profit margin percentage and beside the image of the inventory item, present, in the graphical user interface, a cost of the inventory item below the average sales time and below the image of the inventory item, present, in the graphical user interface, the inventory recommendation as one of a plurality of inventory recommendations in a tabular format sorted by shortest average sales time, present, in the graphical user interface, an order button with the inventory item that, when selected triggers an order of the inventory item, and place an order for the inventory item with the order button.

9. The system of claim 8, wherein the computer processor is further configured to, before receiving the inventory item information:

generate, based on the inventory recommendation tool use request, a business entity categorization request, transmit the business entity categorization request to the BMA, and receive, in response to the business entity categorization request, the business entity categorization information.

10. The system of claim 8, wherein, to generate the inventory recommendation corresponding to the business category set, the computer processor is further configured to:

rank the plurality of items in the inventory item set based on the average sales time for each item of the plurality of items, rank the plurality of items based on a profit margin for each of the items of the plurality of items, and rank the plurality of items based on a shelf time for each of the items of the plurality of items.

11. The system of claim 10, wherein, before ranking the plurality of items, the computer processor is further configured to, before ranking the plurality of items, filter the plurality of items to include a subset of the plurality of items within a threshold distance of a location of the business entity.

12. The system of claim 8, wherein the inventory recommendation tool and the BMA are operatively connected via a network.

13. The system of claim 8, wherein the inventory categorization information is generated by a categorization module of the inventory recommendation tool.

14. A non-transitory computer readable medium comprising instructions that, when executed by a computer processor, perform a method comprising:

receiving, by an inventory recommendation tool from a business management application (BMA) used by a business entity, the inventory recommendation tool use request to use an inventory recommendation tool;

determining, by a categorization module of the inventory recommendation tool, a business category set based on a business entity categorization information, wherein the business category set is a business category that includes more than one characteristic;

storing, by the inventory recommendation tool, the business category set as a data structure in an inventory recommendation tool data repository;

receiving, by the inventory recommendation tool, inventory item information related to an inventory item from another business entity, wherein the inventory item information is obtained by scanning at least one or more barcodes, quick response codes, serial numbers, product numbers, and radio frequency identification tag information;

performing, by the categorization module, an inventory categorization operation based on the inventory item information to obtain inventory categorization information, wherein the inventory categorization operation makes a classification decision to place the inventory item into two inventory item categories;

storing, by the inventory recommendation tool, the inventory categorization information in the inventory recommendation tool data repository;

performing, by an inventory management module of the inventory recommendation tool, an inventory management operation based on the inventory item information to obtain inventory management information;

storing, by the inventory recommendation tool, the inventory management information in the inventory recommendation tool data repository;

after determining that the inventory item information includes new inventory item information, repeating at least the steps of receiving the inventory item information and performing the inventory management operation;

receiving, by the inventory recommendation tool and from the BMA, an inventory recommendation request;

obtaining, by the inventory recommendation tool, information associated with a plurality of inventory items corresponding to the business category set;

obtaining, by the inventory recommendation tool, information associated with a plurality of inventory items corresponding to the business entity;

generating, by an inventory recommendation generator of the inventory recommendation tool and in response to the inventory recommendation request, an inventory recommendation corresponding to the business category set for a first inventory item category;

generating, by the inventory recommendation generator and in response to the inventory recommendation request, an inventory recommendation corresponding to the business entity for a second inventory item category;

combining, by the inventory recommendation tool, the inventory recommendation for the first inventory item category and the second inventory item category to enhance the inventory recommendation to the BMA used by the business entity; and presenting, by the inventory recommendation tool, the inventory recommendation to a graphical user interface, wherein the inventory recommendation displays the inventory item, which is from the other business entity and is from a vendor of the other business entity, and wherein the vendor of the other business entity receives an order from the business entity in response to the inventory recommendation;

presenting, in the graphical user interface, displaying an image of the inventory item;

presenting, in the graphical user interface, displaying a name of the vendor of the inventory item beside the image of the inventory item;

presenting, in the graphical user interface, displaying a name of the inventory item below the name of the vendor and beside the image of the inventory item;

presenting, in the graphical user interface, displaying a profit in dollars and an average profit margin percentage below the name of the inventory item and beside the image of the inventory item;

presenting, in the graphical user interface, displaying an average sales time in days below the profit and average profit margin percentage and beside the image of the inventory item;

presenting displaying a cost of the inventory item below the average sales time and below the image of the inventory item;

presenting, in the graphical user interface, displaying the inventory recommendation as one of a plurality of inventory recommendations in a tabular format sorted by shortest average sales time;

presenting, in the graphical user interface, an order button with the inventory item that, when selected triggers an order of the inventory item; and placing an order for the inventory item with the order button.

15. The non-transitory computer readable medium of claim 14, further comprising instructions for:
generating, based on the inventory recommendation tool use request, a business entity categorization request;
transmitting the business entity categorization request to the BMA; and
receiving, in response to the business entity categorization request, the business entity categorization information.

16. The non-transitory computer readable medium of claim 14, further comprising instructions for:
ranking the plurality of items in the inventory item set based on the average sales time for each item of the plurality of items;
ranking the plurality of items based on a profit margin for each of the items of the plurality of items; and
ranking the plurality of items based on a shelf time for each of the items of the plurality of items.

17. The non-transitory computer readable medium of claim 16, further comprising instructions for:
before ranking the plurality of items, filtering the plurality of items to include a subset of the plurality of items within a threshold distance of a location of the business entity.

18. The non-transitory computer readable medium of claim 14, further comprising instructions for:
ranking the plurality of items based on the average sales time by the business entity for each item of the plurality of items;
ranking the plurality of items based on a profit margin for each of the items of the plurality of items; and
ranking the plurality of items based on a shelf time for each of the items of the plurality of items.

19. The non-transitory computer readable medium of claim 14, wherein the inventory management information consists of at least one selected from a group consisting of an item identifier, an item description, a purchase price, a sales price, a profit margin, price point information, a shelf time, the average sales time, geographic information, and item relationship information.

20. The non-transitory computer readable medium of claim 14, wherein the inventory recommendation is provided to the user via display on a display device operatively connected to a computing device on which the BMA used by the business entity executes.

\* \* \* \* \*